United States Patent [19]
Saito et al.

[11] Patent Number: 6,150,485
[45] Date of Patent: Nov. 21, 2000

[54] PROCESS FOR PRODUCING FLUORINE-CONTAINING ELASTOMER

[75] Inventors: Satoru Saito, Kitaibaraki; Haruyoshi Tatsu, Hitachi, both of Japan

[73] Assignee: Nippon Mektron, Limited, Japan

[21] Appl. No.: 09/248,430

[22] Filed: Feb. 11, 1999

Related U.S. Application Data

[62] Division of application No. 09/113,736, Jul. 10, 1998, Pat. No. 6,011,129.

[30] Foreign Application Priority Data

Jul. 18, 1997 [JP] Japan .................................. 9-209863

[51] Int. Cl.$^7$ ..................... C08F 214/18; C08F 214/20; C08F 214/26; C08F 214/12
[52] U.S. Cl. ..................... 526/206; 526/247; 526/249; 526/253; 526/254; 526/255
[58] Field of Search ..................... 526/206, 247, 526/249, 255

[56] References Cited

U.S. PATENT DOCUMENTS

| | | |
|---|---|---|
| 4,594,469 | 6/1986 | Loveless ............... 526/206 |
| 4,745,165 | 5/1988 | Arcella . |
| 4,748,223 | 5/1988 | Haruyoshi ............... 526/206 |
| 4,943,622 | 7/1990 | Naraki et al. ............ 526/206 |
| 5,151,492 | 9/1992 | Abe ......................... 526/206 |
| 5,173,553 | 12/1992 | Albano . |
| 5,214,106 | 5/1993 | Carlson . |
| 5,225,504 | 7/1993 | Tatsu et al. .............. 526/206 |

FOREIGN PATENT DOCUMENTS

| | | |
|---|---|---|
| 0 834 521 A1 | 8/1998 | European Pat. Off. . |
| 7-285948 | 10/1995 | Japan . |

*Primary Examiner*—Fred Zitomer
*Attorney, Agent, or Firm*—Baker & Daniels

[57] ABSTRACT

Fluorine-containing elastomers produced through copolymerization reaction of vinylidene fluoride, tetrafluoroethylene, perfluoro(lower alkyl vinyl ether) and chlorotrifluoroethylene in the presence of a bromine-containing monomer compound and an iodine- and bromine-containing compound, where hexafluoropropene can be further copolymerized, have not only a distinguished resistance to amine-based additives and also distinguished low-temperature characteristic and engine oil resistance, and also a lower cost attained by reduced copolymer proportion of perfluoro(lower alkyl vinyl ether).

5 Claims, No Drawings

6,150,485

PROCESS FOR PRODUCING FLUORINE-CONTAINING ELASTOMER

This is a Divisional of application Ser. No. 09/113,736, filed Jul. 10, 1998 U.S. Pat. No. 6,011,129.

BACKGROUND OF THE INVENTION

1. Field of the Invention

The present invention relates to a process for producing a fluorine-containing elastomer, and more particularly to a process for producing a fluorine-containing elastomer having a good resistance to an amine-based additive.

2. Description of Related Art

Fluorine-containing elastomers have distinguished heat resistance, chemical resistance and compression set resistance characteristic, and thus have been so far used in many fields including automobile parts. With recent trends of higher performance and lower fuel consumption for automobile engines, a higher performance is required for the engine oil. To this effect a large amount of an amine-based additive is often added to the engine oil. Thus, the fluorine-containing elastomers to be used as materials for automobile parts in contact with the engine oil requires an amine-based additive resistance.

Vinylidene fluoride-hexafluoropropene copolymers and vinylidene fluoride-hexafluoropropene-tetrafluoroethylene terpolymers are widely used as fluorine-containing elastomers, but the vulcanization products of these fluorine-containing elastomers undergo surface hardening and deterioration by engine oils and thus are not suitable for application to parts in contact with engine oils. It seems that the vinylidene fluoride-hexafluoropropene linking sites in the polymer main chain react with the amine-based additive to cause hardening.

Several fluorine-containing elastomers with an improved resistance to the amine-based additive are known on the other hand.

Tetrafluoroethylene-perfluoro(methyl vinyl ether) copolymers show a distinguished resistance not only to the amine-based compounds, but also to various polar solvents, but have poor low-temperature characteristics, such as glass transition point (Tg) as low as about −5° to about 0° C. and are more expensive than the above-mentioned, widely used fluorine-containing elastomers.

Tetrafluoroethylene-propylene copolymers show a good resistance to amine-based compounds and various polar solvents, but have a TR-10 as an indicator of low-temperature characteristics of 10° C. and are inferior to low-temperature characteristics compared with the above-mentioned, widely used fluorine-containing elastomers.

Vinylidene fluoride-propylene-tetrafluoroethylene terpolymers or vinylidene fluoride-α-olefin-hexafluoropropene-tetrafluoroethylene quaternary copolymers have a somewhat improved low-temperature characteristic (TR-10:−8° C.), though not satisfactory, and cannot be used as molding materials for the dynamic sealing due to a poor wear resistance.

Vinylidene fluoride-tetrafluoroethylene-perfluoro(methyl vinyl ether) terpolymers have distinguished resistance to amine-based additives and low-temperature characteristic (TR-10:−30° C.), but have such a problem as several times higher cost than those of the above-mentioned, widely used fluorine-containing elastomers, because of the inevitable copolymerization of about 15 to about 25% by mole of expensive perfluoro(methyl vinyl ether).

SUMMARY OF THE INVENTION

An object of the present invention is to provide a process for producing a fluorine-containing elastomer having not only a distinguished resistance to amine-based additives, but also distinguished low-temperature characteristic and engine oil resistance at a lower cost by reducing a copolymerization proportion of perfluoro(lower alkyl vinyl ether).

Such an object of the present invention can be attained by producing a fluorine-containing elastomer through copolymerization reaction of vinylidene fluoride, tetrafluoroethylene, perfluoro(lower alkyl vinyl ether) having a lower alkyl group having 1 to 3 carbon atoms and chlorotrifluoroethylene in the presence of a bromine-containing monomer compound and an iodine- and bromine-containing compound, where hexafluoropropene can be further copolymerized.

DETAILED DESCRIPTION OF THE INVENTION

Fluorine-containing elastomers obtained according to the present process have a copolymer composition comprising about 50 to about 85% by mole, preferably about 60 to about 80% by mole, of vinylidene fluoride; about 5 to about 30% by mole, preferably about 5 to about 20% by mole, of tetrafluoroethylene; about 2 to about 15% by mole of perfluoro(lower alkyl vinyl ether) having a perfluoro lower alkyl group having 1 to 3 carbon atoms, such as perfluoro (methyl vinyl ether), perfluoro-(ethyl vinyl ether), perfluoro (propyl vinyl ether), etc.; and about 2 to about 20% by mole, preferably about 5 to about 15% by mole, of chlorotrifluoroethylene, where not more than 10% by mole, preferably not more than about 5% by mole, of hexafluoropropene may be further copolymerized, sum total being 100% by mole.

When the copolymerization proportion of vinylidene fluoride is less than about 50% by mole, the low-temperature characteristic will be deteriorated, whereas above about 85% by mole the chemical resistance and elasticity will be lowered. When the copolymerization proportion of tetrafluoroethylene is less than about 5% by mole, the heat resistance and chemical resistance will be lowered, whereas above about 30% by mole the low-temperature characteristic will be deteriorated. When the copolymerization proportion of perfluoro(lower alkyl vinyl ether) is less than about 2% by mole, the low-temperature characteristic and chemical resistance will be lowered, whereas copolymerization proportion above about 15% by mole is not preferable from the viewpoint of cost. Furthermore, when the copolymerization proportion of chlorotrifluoroethylene is less than about 2% by mole, no desired cost-down effect can be obtained, whereas above about 20% by mole the low-temperature characteristic will be deteriorated. In case of further copolymerization of hexafluoropropene, the oil resistance can be improved, but when the copolymerization proportion of hexafluoropropene is above about 10% by mole, the resistance to amine-based additives will be lowered.

The present fluorine-containing elastomers can be further copolymerized with fluorinated olefins, various olefin compounds or vinyl compounds to such a proportion as not to inhibit the copolymerization reaction or deteriorate the physical properties of vulcanization products (e.g. not more than about 20% by mole on the basis of the elastomer) mainly to reduce the cost. Fluorinated olefins for use in the present invention include, for example, monofluoroethylene, trifluoroethylene, trifluoropropylene, pentafluoropropylene, hexafluoroisobutylene, dichlorodifluoroethylene, etc. Olefin compounds and vinyl compounds for use in the present invention include, for example, ethylene, propylene, 1-butene, isobutylene, methyl vinyl ether, ethyl vinyl ether, butyl vinyl ether, cyclohexyl vinyl ether, vinyl acetate, vinyl propionate, vinyl chloride, vinylidene chloride, trifluorostyrene, etc., among which at least one of trifluoroethylene, methyl vinyl ether, etc. can be preferably used.

Copolymerization reaction can be carried out according to any polymerization method, for example, by emulsion polymerization, suspension polymerization, solution polymerization, bulk polymerization, etc., among which the emulsion polymerization method is preferable from a higher polymerization degree and the economical viewpoints. The emulsion polymerization reaction can be carried out generally at a temperature of about 20 to about 80° C. under a pressure of about 0 to about 20 kg/cm² gauge, using a water-soluble inorganic peroxide such as ammonium persulfate, etc. or its redox system as a catalyst and also using an emulsifier such as ammonium perfluorooctanoate, ammonium perfluoroheptanoate and ammonium perfluorononanoate or their mixture, preferably ammonium perfluorooctanoate. To adjust pH in the polymerization system a buffering electrolyte such as phosphates ($Na_2HPO_4$, $NaH_2PO_4$, $KH_2PO_4$, etc.) or borates ($Na_2B_4O_7$, etc.), or NaOH can be also used.

The copolymerization reaction is carried out in the presence of a bromine-containing monomer compound and an iodine- and bromine-containing compound, preferably an iodine- and bromine-containing bromine compound represented by the following general formula:

RBrnIm where R is a fluorocarbon group, a chlorofluorocarbon group, a chlorohydrocarbon group or a hydrocarbon group, and n and m each are 1 or 2.

Bromine-containing monomer compound to be used for forming cross-linking sites includes, for example, brominated vinyl compounds or brominated olefins having 2 to 10 carbon atoms, preferably 2 to 5 carbon atoms, such as vinyl bromide, 1-bromo-2,2-difluoroethylene, perfluoroallyl bromide, 4-bromo-1,1,2-trifluorobutene, 4-bromo-3,3,4,4-tetrafluorobutene, 4-bromo-1,1,3,3,4,4-hexafluorobutene, bromotrifluoroethylene, 4-bromo-3-chloro-1,1,3,4,4-pentafluorobutene, 6-bromo-5,5,6,6-tetrafluoro-hexene, 4-bromoperfluorobutene-1,3,3-difluoroallyl bromide, etc., among which 1-bormo-2,2-difluoroethylene is preferably used.

About 0.001 to about 5% by mole, preferably about 0.01 to about 3% by mole, more preferably about 0.1 to about 3% by mole, of the bromine-containing monomer compound can be used on the basis of total of the above-mentioned 4 kinds or 5 kinds of comonomers for constituting the fluorine-containing elastomer. Below about 0.001% by mole the compression set resistance characteristic of the resulting vulcanization products will be deteriorated, whereas above about 5% by mole elongation of the resulting vulcanization products will be lowered.

Iodine- and bromine-containing bromine compound represented by the general formula RBrnIm, (where R, m and n have the same meanings as defined above) acts as a chain transfer agent to adjust the molecular weight, thereby improving the processability.

The iodine- and bromine-containing compound represented by the said general formula is selected from those which cannot lose the effects through side reactions under polymerization conditions, wherein R is selected from fluorohydrocarbon groups, chlorofluorohydrocarbon groups, chlorohydrocarbon groups or hydrocarbon groups generally having 1 to 10 carbon atoms, and each of the groups may have a functional group such as —O—, —S—, =NR, —COOH, —$SO_2$, —$SO_3H$, —$PO_3H$, etc.

Such iodine- and bromine-containing compound may be a saturated or unsaturated linear or aromatic compound, wherein n and m each are preferably 1. The iodine and bromine-containing compound where at least one of n and m is 2 produces a fluorine--containing elastomer of three-dimensional structure, and thus is desirable to use within such a range as not to deteriorate the processability.

The linear iodine- and bromine-containing compound includes, for example, 1-bromo-2-iodoperfluoroethane, 1-bromo-3-iodo-perfluoropropane, 1-bromo-4-iodoperfluorobutane, 2-bromo-3-iodoperfluorobutane, 1-bromo-2-iodoperfluoro(2-methylpropane), monobromomonoiodoperfluorocyclobutane, monobromomonoiodoper-fluropentane, monobromomonoiodoperfluoro-n-octane, monobromomonoiodoperfluorocyclohexane, 1-bromo-1-iodo-2-chloroperfluoroethane, 1-bromo-2-iodo-2-chloroperfluoroethane, 1-iodo-2-bromo-2-chloroperfluoroethane, 1,1-dibromo-2-iodoperfluoroethane, 1,2-dibromo-2-iodoperfluoroethane, 1,2-diiodo-2-bromoperfluoroethane, 1-bromo-2-iodo-1,2,2-trifluoroethane, 1-iodo-2-bromo-1,2,2-trifluoroethane, 1-bromo-2-iodo-1,1-difluoroethane, 1-iodo-2-bromo-1,1-difluoroethane, 1-bromo-2-iodo-1-fluoroethane, 1-iodo-2-bromo-1-fluoroethane, 1-bromo-2-iodo-1,1,3,3,3-pentafluoropropane, 1-iodo-2-bromo-1,1,3,3,3-pentafluoropropane, 1-bromo-2-iodo-3,3,4,4,4-pentafluorobutane, 1-iodo-2-bromo-3,3,4,4,4-pentafluorobutane, 1,4-dibromo-2-iodoperfluorobutane, 2,4-dibromo-1-iodoperfluorobutane, 1,4-diiodo-2-bromoperfluorobutane, 1,4-dibromo-2-iodo-3,3,4,4,-tetrafluorobutane, 1,4-diiodo-2-bromo-3,3,4,4-tetrafluorobutane, 1,1-dibromo-2,4-diiodoperfluorobutane, 1-bromo-2-iodo-1-chloroethane, 1-iodo-2-bromo-1-chloroethane, 1-bromo-2-iodo-2-chloroethane, 1-bromo-2-iodo-1,1-dichloroethane, 1,3-dibromo-2-iodoperfluoropropane, 2,3-dibromo-2-iodoperfluoropropane, 1,3-diiodo-2-bromoperfluoropropane, 1-bromo-2-iodoethane, 1-bromo-2-iodopropane, 1-iodo-2-bromopropane, 1-bromo-2-iodobutane, 1-iodo-2-bromobutane, 1-bromo-2-iodo-2-trifluoromethyl-3,3,3-trifluoropropane, 1-iodo-2-bromo-2-trifluoromethyl-3,3,3-trifluoropropane, 1-bromo-2-iodo-2-phenylperfluoroethane, 1-iodo-2-bromo-2-phenylperfluoroethane, 3-bromo-4-iodoperfluorobutene-1, 3-iodo-4-bromoperfluorobutene-1,1-bromo-4-iodoperfluorobutene-1,1-iodo-4-bromoperfluorobutene-1,3-bromo-4-iodo-3,4,4-trifluorobutene-1,4-bromo-3-iodo-3,4, 4-trifluorobutene-1,3-bromo-4-iodo-1,1,2-trifluorobutene-1,4-bromo-5-iodoperfluoropentene-1,4-iodo-5-bromoperfluoropentene-1,4-bromo-5-iodo-1,1,2-trifluoropentene-1,4-iodo-5-bromo-1,1,2-trifluoropentene-1,1-bromo-2-iodo-perfluoromethyl perfluoroethyl ether, 1-bromo-2-iodoperfluoroethyl perfluoropropyl ether, 2-bromo-3-iodoperfluoropropyl perfluorovinyl ether, 1-bromo-2-iodoperfluoroethyl perfluorovinyl ether, 1-bromo-2-iodoperfluoroethyl perfluoroallyl ether, 1-bromo-2-iodoperfluoroethyl methyl ether, 1-iodo-2-bromoperfluoroethyl methyl ether, 1-iodo-2-bromoethyl ethyl ether, 1-bromo-2-iodoethyl-2'-chloroethyl ether, etc. These iodine and bromine-containing compounds can be prepared according to an appropriate, known process; for example, a monobromomonoiodo, fluorine-containing olefin can be obtained by allowing a fluorine-containing olefin to react with iodine bromide.

The aromatic, iodine- and bromine-containing compound includes, for example, benzenes having a substituent group such as 1-iodo-2-bromo, 1-iodo-3-bromo, 1-iodo-4-bromo, 3,5-dibromo-1-iodo, 3,5-diiodo-1-bromo, 1-(2-iodoethyl)-4-(2-bromoethyl), 1-(2-iodoethyl)-3-(2-bromoethyl), 1-(2-iodoethyl)-4-(2-bromoethyl) 3,5-bis(2-bromoethyl)-1-(2-iodoethyl), 3,5-bis(2-iodoethyl)-1-(2-bromoethyl), 1-(3-iodopropyl)-2-(3-bromo-propyl), 1-(3-iodopropyl)-3-(3-bromopropyl), 1-(3-iodopropyl)-4-(3-bromopropyl), 3,5-bis(3-bromopropyl)-1-(3-iodopropyl), 1-(4-iodobutyl)-3-(4-bromobutyl), 1-(4-iodobutyl)-4-(4-bromo-butyl), 3,5-bis(4-iodobutyl)-1-(4-bromobutyl), 1-(2-iodoethyl)-3-(3-bromopropyl), 1-(3-iodopropyl)-3-(4-bromobutyl), 3,5-bis-(3-bromopropyl)-1-(2-iodoethyl), 1-iodo-3-(2-bromoethyl), 1-iodo-3-(3-bromopropyl), 1,3-diiodo-5-(2-bromoethyl), 1,3-diiodo-5-(3-bromopropyl), 1-bromo-3-(2-iodoethyl), 1-bromo-3-(3-iodopropyl), 1,3-dibromo-5-(2-iodoethyl), 1,3-dibromo-5-(3-iodopropyl), etc., and perfluorobenzenes having a substituent group such as 1-iodo-2-bromo, 1-iodo-3-bromo, 1-iodo-4-bromo, 3,5-dibromo-1-iodo, 3,5-diiodo-1-bromo, etc.

During the polymerization reaction, the iodine and bromine of these iodine- and bromine-containing compounds readily undergo radical cleavage under the action of an organic peroxide radical-generating source, and the monomers undergo addition growth reaction owing to the high reactivity of the generated radicals, and then the reaction is discontinued by withdrawing the iodine and bromine from the iodine- and bromine-containing compound to give a fluorine containing elastomer having iodine and bromine at the molecule terminals. The iodine atom and bromine atom bonded to the molecule terminals also act as cross-linking sites for the peroxide vulcanization.

The iodine- and bromine-containing compound is bonded to the fluorine-containing elastomer so that not more than about 5% by weight, generally about 0.001 to about 5% by weight, preferably about 0.01 to about 3% by weight in terms of iodine and bromine each may be contained in the resulting fluorine-containing elastomer.

The present fluorine-containing elastomer has a ηsp/c value of about 0.1 to about 2 dl/g, preferably about 0.2 to about 1.5 dl/g as measured at 35° C. in methyl ethyl ketone and can be cured by so far well known various vulcanization methods, for example, by peroxide vulcanization using an organic peroxide, polyamine vulcanization using a polyamine compound or a polyol vulcanization using a polyhydroxy compound, or by irradiation of radiation rays, electron beam, etc. Among them, peroxide vulcanization is particularly preferable, because the cured elastomer can give vulcanization products showing good resistances to basic substances such as amines, etc. or to nucleophilic substances.

The organic peroxide for use in the peroxide vulcanization includes, for example, 2,5-dimethyl-2,5-bis(tert-butylperoxy)hexane, 2,5-dimethyl-2,5-bis(tert-butylperoxy)-hexine-3, benzoyl peroxide, bis(2,4-dichlorobenzoyl) peroxide, dicumyl peroxide, di-tert-butyl peroxide, tert-butyl cumyl peroxide, tert-butylperoxybenzene, 1,1-bis(tert-butylperoxy)-3,5,5-trimethyl cyclohexane, 2,5-dimetylhexane-2,5-dihydroxyperoxide, α,ω'-bis(tert-butylperoxy)-p-diisopropylbenzene, 2,5-dimethyl-2,5-di(benzoylperoxy)hexane, tert-butylperoxy isopropyl carbonate etc.

In the peroxide vulcanization using the organic peroxide, a polyfunctional, unsaturated compound, such as tri(meth) allyl isocyanulate, tri(meth)allyl cyanulate, triallyl trimellitate, N,N'-m-phenylene bismaleimide, diallyl phthalate, tris(diallyl-amine)-s-triazine, trially phosphite, 1,2-polybutadiene, ethyleneglycol diacrylate, diethyleneglycol diacrylate, etc. can be usually used as a cocross-linking agent to obtain more distinguished vulcanization characteristics, mechanical strength and compression set.

The foregoing additive components to the peroxide vulcanization system are used in the following amounts: the organic peroxide is used in an amount of generally about 0.1 to about 10 parts by weight, preferably about 0.5 to about 5 parts by weight per 100 parts by weight of the fluorine-containing elastomer, and the cocross-linking agent is used in an amount of generally about 0.1 to about 10 parts by weight, preferably about 0.5 to about 5 parts by weight and a cross-linking aid is used in an amount of not more than about 15 parts by weight per 100 parts by weight of the fluorine-containing elastomer.

Furthermore, an inorganic filler such as carbon black, silica, etc.; an acid acceptor such as ZnO, CaO, $Ca(OH)_2$, MgO, PbO, synthetic hydrotalcite, etc; various pigments; a processing aid such as polyethyleneglycol monomethyl ether, Crown ether, etc.; a plasticizer such as $RfO[OCF(CF_3)CF_2O]nRf'$, $RfO[CF(CF_3)CF_2O]p(CF_2CF_2O)q(CF_2O)$ $rRf'$, $RfO(CF_2CF_2O)n(CF_2O)mRf'$, $RfO(CF_2CF_2CF_2O)nRf'$, where Rf and Rf' each are a perfluoroalkyl group, a perfluoroalkyleneether triazine oligomer having $—(CFXOCF_2)a(CF_2)b(CF_2OCFX)c—$ in the molecule, where X is F or a $CF_3$ group (see JP-A-7-285948); a stabilizer, and other necessary additives can be appropriately added to the composition containing the above-mentioned components.

The present fluorine-containing elastomer can be further blended or cocross-linked with other substance having a peroxide cross-linkability such as silicone oil, silicone rubber, fluorosilicone rubber, fluorophosphazene rubber, ethylene-vinyl acetate copolymer, ethylene-acrylic acid ester copolymer, ethylene-propylene(-diene) copolymer rubber, acrylonitrile-butadiene copolymer rubber, acrylic acid ester rubber, etc.

The present composition can be prepared by kneading through rolls, a kneader, a Bambury mixer, etc., and its cross-linking is carried out by heating at about 140 to about 220° C. for about 5 to about 60 minutes. If required, secondary vulcanization is carried out preferably in air or in an inert atmosphere such as a nitrogen gas atmosphere at about 150 to about 250° C. for about 5 to about 50 hours.

The present fluorine-containing elastomer shows a distinguished chemical resistance, particularly to amine-based additives contained in engine oil, etc., and also has distinguished low-temperature characteristic, heat resistance and compression set resistance characteristics. A distinguished cost performance can be obtained by reducing the copolymerization proportion of expensive perfluoro(lower alkyl vinyl ether).

Furthermore, it is noted that chlorotrifluoroethylene so far presumed to promote reaction with amines is effective for improving the amine resistance and additive oil resistance contrary to the expectation.

PREFERRED EMBODIMENTS OF THE INVENTION

The present invention will be described below, referring to Examples.

EXAMPLE 1

The following compounds were charged into a stainless steel autoclave having a capacity of 10 L, after flushed with a nitrogen gas and then evacuated:

| | |
|---|---|
| Ammonium perfluorooctanoate | 15.4 g |
| Sodium hydroxide | 2.2 g |
| Disodium hydrogen phosphate | 11.0 g |
| Distilled water | 3,360 ml |

After the autoclave was flushed again and evacuated, a monomer mixture consisting of the following compounds was charged therein:

| | |
|---|---|
| Vinylidene fluoride [VdF] | 820 g (70 mol. %) |
| Tetrafluoroethylene [TFE] | 180 g (10 mol. %) |
| Perfluoro(methyl vinyl ether) [FMVE] | 300 g (10 mol. %) |
| Chlorotrifluoroethylene [CTFE] | 210 g (10 mol. %) |

The autoclave inside temperature was elevated to 50° C., and then the following compounds were charged therein to initiate polymerization reaction:

| | |
|---|---|
| 1-Bromo-2-iodotetrafluoroethylene | 7.0 g |
| 1,1-Difluoro-2-bromoethylene | 7.0 g |
| Ammonium persulfate | 1.5 g |

The reaction was continued for 20 hours and then the residual gas was purged therefrom to interrupt the reaction. 5.0 Kg of the resulting aqueous latex was salted out with an aqueous sodium chloride solution, and dried to obtain 1.4 Kg of white fluorine-containing elastomer A (polymerization yield: 93%).

It was found by $^{19}$F-NMR analysis that the resulting fluorine-containing elastomer had a copolymer composition in a molar ratio of VdF/TFE/FMVE/CTFE=65/15/8/12 and its ηsp/c value was 1.1 dl/g.

EXAMPLE 2

In Example 1, a monomer mixture having the following charge amounts was used, whereby 1.3 Kg of white fluorine-containing elastomer B having the following copolymer composition in molar ratio was obtained with 72sp/c=1.0 dl/g (polymerization yield: 88%):

| | Charge amounts | Copolymer composition |
|---|---|---|
| VdF | 820 g (70 mol. %) | 69 mol. % |
| TFE | 180 g (10 mol. %) | 14 mol. % |
| FMVE | 150 g (5 mol. %) | 3 mol. % |
| CTFE | 320 g (15 mol. %) | 14 mol. % |

EXAMPLE 3

In Example 1, a monomer mixture having the following charge amounts (HFP: hexafluoropropene) was used, whereby 1.4 Kg of white fluorine-containing elastomer C having the following copolymer composition in molar ratio was obtained with ηsp/c=0.9 dl/g (polymerization yield: 93%):

| | Charge amounts | Copolymer composition |
|---|---|---|
| VdF | 820 g (70 mol. %) | 70 mol. % |
| TFE | 180 g (10 mol. %) | 12 mol. % |
| FMVE | 150 g (5 mol. %) | 4 mol. % |
| HFE | 140 g (5 mol. %) | 6 mol. % |
| CTFE | 210 g (10 mol. %) | 8 mol. % |

Comparative Example 1

The following compounds were charged into a stainless steel autoclave having a capacity of 10 L after flushed with a nitrogen gas and then evacuated:

| | |
|---|---|
| Ammonium perfluorooctanoate | 30 g |
| Disodium hydrogen phosphate | 10 g |
| Distilled water | 5 L |

After the autoclave was flushed again with a nitrogen gas and the evacuated, a monomer mixture having the following initial charge amounts described hereinafter was charged therein at the initial stage.

After the autoclave inside temperature was elevated to 70° C., the following compounds were charged therein to initiate polymerization reaction:

| | |
|---|---|
| 1,1-Difluoro-2-iodotetrafluoroethylene | 10 g |
| 1-Bromo-2-iodotetrafluoroethane | 9 g |
| Ammonium persulfate | 7 g |

With progress of polymerization reaction, the autoclave inside pressure was lowered, and when the pressure reached to 3.3 MPa, the monomer mixture was additionally charged to make the pressure to 3.4 MPa. After repetition of polymerization pressure decrease to 3.3 MPa and increase to 3.4 MPa, the monomer mixture was additionally charged therein in the total charge amounts described hereinafter within the period of 90 minutes.

After the final additional charge of the monomer mixture, polymerization reaction was continued for further one hour, and then the unreacted gas was purged therefrom, whereby 7.4 Kg of an aqueous latex was obtained. The aqueous latex so obtained was salted out with an aqueous sodium chloride solution and dried, whereby 2.9 Kg of white fluorine-containing elastomer D having the following copolymer composition in molar ratio was obtained with ηsp/c=0.95 dl/g (polymerization yield: 81%):

| | Initial charge amounts | Total additional charge amounts | Copolymer composition |
|---|---|---|---|
| VdF | 210 g | 350 g | 65 mol. % |
| TFE | 510 g | 850 g | 17 mol. % |
| HFP | 940 g | 700 g | 18 mol. % |

Comparative Example 2

In Example 1, a monomer composition having the following charge amounts was used. From 5.1 Kg of the resulting aqueous latex was obtained 1.55 Kg of white fluorine-containing elastomer E having the following copolymer composition in molar ratio was obtained with ηsp/c=0.85 dl/g (polymerization yield: 96%):

|      | Charge amounts    | Copolymer composition |
|------|-------------------|-----------------------|
| VdF  | 820 g (70 mol. %) | 71 mol. %             |
| TFE  | 180 g (10 mol. %) | 11 mol. %             |
| FMVE | 610 g (20 mol. %) | 18 mol. %             |

Reference Examples 1 to 5

| | |
|---|---|
| Fluorine-containing elastomer A (Ref. Ex. 1) | 100 parts by weight |
| Fluorine-containing elastomer B (Ref. Ex. 2) | 100 parts by weight |
| Fluorine-containing elastomer C (Ref. Ex. 3) | 100 parts by weight |
| Fluorine-containing elastomer D (Ref. Ex. 4) | 100 parts by weight |
| Fluorine-containing elastomer E (Ref. Ex. 5) | 100 parts by weight |
| MT Carbon black | 30 parts by weight |
| Zinc oxide | 6 parts by weight |
| Triallyl isocyanurate | 4 parts by weight |
| Organic peroxide (Luperco 101XL, trademark of a product commercially available from Atochem-Yoshitomi Pharmaceutical Industries Ltd., Japan) | 3 parts by weight |

The foregoing components were kneaded in a two-roll mill, and the resulting kneading products were subjected to press vulcanization (primary vulcanization) at 180° C. for 10 minutes and oven vulcanization (secondary vulcanization) at 200° C. for 22 hours. The resulting vulcanization products were determined for the following properties:

Normal state physical properties: according to DIN 53505 and 53504

Thermal degradation test: measurements of changes in normal state physical properties at 230° C. after 70 hours Compression set: according to ASTM D-395 Method B Low-temperature characteristic: evaluated as TR-10

Engine oil resistance: measurement of changes in normal state physical properties, elongation at surface crack generation and percent volume swelling when dipped in Toyota castle motor oil green SG 10W-30 at 175° C. for 70 hours.

Resistance to amine-based additive: measurement of changes in normal state physical properties, elongation at surface crack generation and percent volume swelling when dipped in 1% benzylamine-mixed JIS No.3 oil at 175° C. for 70 hours.

Reference Example 6

| | |
|---|---|
| Fluorine-containing elastomer F (Aflas 200, trademark of a product commercially available from Asahi Glass Co., Ltd., Japan) | 100 parts by weight |
| MT carbon black | 30 parts by weight |
| Calcium stearate | 1 parts by weight |
| Triallyl isocyanurate | 4 parts by weight |
| Organic peroxide (Peroxymon F40, trademark of a product commercially available from NOF Corp., Japan) | 3 parts by weight |

The foregoing components were kneaded in a two-roll mill and the resulting kneading product was subjected to press vulcanization at 170° C. for 20 minutes and oven vulcanization at 230° C. for 22 hours. The resulting vulcanization product was determined for the properties in the same manner as in Reference Examples 1 to 5.

Results are shown in the following Table.

TABLE

| | Reference Example No. | | | | | |
|---|---|---|---|---|---|---|
| | 1 | 2 | 3 | 4 | 5 | 6 |
| [Normal state physical properties] | | | | | | |
| Hardness (Shore A) (pts) | 72 | 73 | 71 | 69 | 70 | 70 |
| 100% Modulus (MPa) | 6.0 | 7.5 | 6.5 | 5.8 | 6.8 | 7.5 |
| Strength at break (MPa) | 23.8 | 20.7 | 20.0 | 21.3 | 21.0 | 17.1 |
| Elongation at break (%) | 210 | 200 | 220 | 280 | 220 | 190 |
| [Thermal degradation test] | | | | | | |
| Hardness change (pts) | −1 | −1 | −1 | 0 | 0 | +1 |
| 100% Modulus change ratio (%) | +2 | +5 | +5 | −2 | +3 | +1 |
| Change ratio of Strength at break (%) | −8 | −10 | −5 | −1 | −7 | −3 |
| Change ratio of elongation at break (%) | +5 | +10 | +10 | +5 | −5 | +5 |
| [Compression set] 200° C., 70 hr (%) | 24 | 26 | 26 | 36 | 26 | 30 |
| [Low-temperature characteristic] TR-10 (° C.) | −26 | −23 | −24 | −17 | −30 | −8 |
| [Engine oil resistance] | | | | | | |
| Hardness change (pts) | +2 | +2 | +2 | +3 | +1 | +1 |
| 100% Modulus change ratio (%) | +15 | +15 | +25 | +16 | +10 | +5 |
| Change ratio of strength at break (%) | −27 | −30 | −30 | −50 | −45 | −35 |
| Change ratio of elongation at break (%) | −33 | −35 | −40 | −50 | −40 | −30 |
| Elongation at surface crack generation (%) | 60 | 50 | 40 | 10 | 60 | 80 |
| Percent volume swelling (%) | +0.9 | +1.0 | +1.0 | +1.1 | +1.0 | +4.5 |
| [Resistance to amine-based additive] | | | | | | |
| Hardness change (pts) | +1 | +1 | +1 | +2 | +1 | −2 |
| 100% Modulus change ratio (%) | +12 | +15 | +15 | +25 | +5 | +11 |
| Change ratio of strength at break (%) | −15 | −17 | −15 | −20 | −10 | −6 |
| Change ratio of elongation at break (%) | −10 | −10 | −15 | −30 | −10 | −7 |
| Elongation at surface crack generation (%) | 100 | 90 | 70 | 20 | 100 | 130 |
| Percent volume swelling (%) | +3.3 | +3.8 | +3.5 | +4.3 | +3.4 | +10.7 |

What is claimed is:

1. A process for producing a fluorine-containing elastomer, which comprises subjecting vinylidene fluoride, tetrafluoroethylene, perfluoro(lower alkyl vinyl ether) having a lower alkyl group of 1 to 3 carbon atoms and chlorotrifluoroethylene to copolymerization reaction in the presence of a bromine-containing monomer compound and an iodine- and bromine-containing compound.

2. A process according to claim 1, wherein the bromine-containing monomer compound is a borominated vinyl compound of 2 to 10 carbon atoms.

3. A process according to claim 1, wherein the bromine-containing monomer compound is a brominated olefin of 2 to 10 carbon atoms.

4. A process according to claim 1, wherein the iodine- and bromine-containing compound is a compound represented by the following general formula:

RB$_n$I$_m$ wherein R is a fluorohydrocarbon group, a chlorofluorohydro-carbon group, a chlorohydrocarbon group or a hydrocarbon group, and n and m each are 1 or 2.

5. A process according to claim 1, wherein hexafluoropropene is further subjected to the copolymerization reaction.

* * * * *